US011093041B2

(12) United States Patent
Bender et al.

(10) Patent No.: US 11,093,041 B2
(45) Date of Patent: Aug. 17, 2021

(54) COMPUTER SYSTEM GESTURE-BASED GRAPHICAL USER INTERFACE CONTROL

(71) Applicant: INTERNATIONAL BUSINESS MACHINES CORPORATION, Armonk, NY (US)

(72) Inventors: Michael Bender, Rye Brook, NY (US); Keith R. Walker, Austin, TX (US); Christopher M. Wood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/205,469

(22) Filed: Nov. 30, 2018

(65) Prior Publication Data

US 2020/0174573 A1 Jun. 4, 2020

(51) Int. Cl.
*G06F 3/01* (2006.01)
*G06F 3/0484* (2013.01)
*G06F 9/451* (2018.01)

(52) U.S. Cl.
CPC .......... *G06F 3/017* (2013.01); *G06F 3/04847* (2013.01); *G06F 9/451* (2018.02)

(58) Field of Classification Search
CPC .............................. G06F 3/0482; G06F 3/017
USPC ....................................................... 715/863
See application file for complete search history.

(56) References Cited

U.S. PATENT DOCUMENTS

| 6,088,731 | A  * | 7/2000  | Kiraly ................... G06F 16/951 |
| | | | 709/229 |
| 6,249,606 | B1 * | 6/2001  | Kiraly ................. G06F 3/04883 |
| | | | 345/156 |
| 8,196,066 | B1 * | 6/2012  | Ouyang .............. G06F 3/04883 |
| | | | 715/863 |
| 8,510,675 | B1 * | 8/2013  | Jitkoff ................... G06F 3/0481 |
| | | | 715/788 |
| 9,946,355 | B2 * | 4/2018  | Choi .................. G06K 9/00268 |
| 10,222,891 | B1 * | 3/2019  | Smith ..................... G06F 3/048 |
| 2002/0063734 | A1 | 5/2002  | Khalfay |
| 2004/0196256 | A1 * | 10/2004 | Wobbrock .......... G06F 3/04883 |
| | | | 345/156 |
| 2009/0052785 | A1 * | 2/2009  | Shamaie ............ G06K 9/00355 |
| | | | 382/209 |

(Continued)

*Primary Examiner* — Daniel Rodriguez
(74) *Attorney, Agent, or Firm* — Schmeiser, Olsen & Watts, LLP; Michael A. Petrocelli

(57) ABSTRACT

A gesture-based graphical user interface control system and method are provided. The method may include receiving an indication to recognize an input device gesture to be used for performing a graphical user interface action on the computer system. The method may further include training the computer system to recognize the input device gesture. The training may include receiving gesture data representative of the input device gesture to be used for performing the graphical user interface action and defining the input device gesture based on the gesture data. The method may also include mapping the input device gesture to the graphical user interface action. The mapping may include receiving an indication to define the graphical user interface action on the computer system and defining the graphical user interface action. The method may additionally include detecting performance of the input device gesture and performing the graphical user interface action.

20 Claims, 8 Drawing Sheets

(56) References Cited

U.S. PATENT DOCUMENTS

| | | | | |
|---|---|---|---|---|
| 2010/0058252 | A1* | 3/2010 | Ko | G06F 3/04883 715/863 |
| 2010/0188328 | A1* | 7/2010 | Dodge | G06F 3/04883 345/156 |
| 2011/0080339 | A1* | 4/2011 | Sun | G06F 3/0346 345/157 |
| 2011/0167391 | A1* | 7/2011 | Momeyer | G06F 3/038 715/863 |
| 2011/0169726 | A1* | 7/2011 | Holmdahl | G06K 9/00342 345/156 |
| 2012/0013613 | A1* | 1/2012 | Vesely | G06F 3/04815 345/419 |
| 2012/0066641 | A1* | 3/2012 | Doherty | G06F 9/451 715/800 |
| 2012/0092286 | A1* | 4/2012 | O'Prey | G06F 3/04883 345/174 |
| 2012/0306750 | A1* | 12/2012 | Karasin | G09B 21/003 345/163 |
| 2013/0191789 | A1* | 7/2013 | Calman | G06F 3/017 715/863 |
| 2013/0227418 | A1* | 8/2013 | Sa | G06F 3/017 715/728 |
| 2013/0239052 | A1* | 9/2013 | Moody | G06F 3/017 715/810 |
| 2014/0007020 | A1* | 1/2014 | Park | G06F 3/017 715/863 |
| 2014/0055352 | A1* | 2/2014 | Davis | A61B 5/0261 345/156 |
| 2014/0201666 | A1* | 7/2014 | Bedikian | G06F 3/04815 715/771 |
| 2014/0218343 | A1* | 8/2014 | Hicks | G06F 3/03545 345/179 |
| 2014/0253521 | A1* | 9/2014 | Hicks | G06F 3/03545 345/179 |
| 2014/0289682 | A1* | 9/2014 | Vojak | G06F 3/04883 715/863 |
| 2014/0304665 | A1* | 10/2014 | Holz | G06K 9/00335 715/863 |
| 2015/0227275 | A1* | 8/2015 | Anquetil | G06F 3/017 715/771 |
| 2015/0283702 | A1 | 10/2015 | Izhikevich | |
| 2016/0075015 | A1 | 3/2016 | Izhikevich | |
| 2016/0139690 | A1* | 5/2016 | Chang | G06F 3/03545 345/179 |
| 2016/0328604 | A1* | 11/2016 | Bulzacki | G06Q 10/063 |
| 2017/0060257 | A1 | 3/2017 | St Clair | |
| 2017/0123487 | A1* | 5/2017 | Hazra | G06F 1/163 |
| 2017/0147065 | A1* | 5/2017 | Lee | G06F 1/1694 |
| 2017/0192665 | A1* | 7/2017 | Karmon | G06K 9/00355 |
| 2017/0309163 | A1* | 10/2017 | Lian | H04W 12/065 |
| 2017/0371484 | A1* | 12/2017 | Fleck | G06F 3/0418 |
| 2018/0011456 | A1* | 1/2018 | Zhou | G04G 21/00 |
| 2018/0032997 | A1 | 2/2018 | Gordon | |
| 2018/0088677 | A1* | 3/2018 | Zhang | G06F 3/0304 |
| 2018/0095653 | A1* | 4/2018 | Hasek | G06F 3/041 |
| 2018/0136733 | A1* | 5/2018 | Schalla | B64D 13/00 |
| 2018/0232352 | A1* | 8/2018 | Fulford | G09B 7/00 |
| 2018/0246577 | A1* | 8/2018 | Bostick | G06F 3/0485 |
| 2019/0068687 | A1* | 2/2019 | Masi | G06F 3/0486 |
| 2019/0302895 | A1* | 10/2019 | Jiang | G06K 9/00389 |

* cited by examiner

COMPUTER SYSTEM GESTURE-BASED GRAPHICAL USER INTERFACE CONTROL

BACKGROUND

The present disclosure relates to systems and methods for gesture-based graphical user interface control, and more specifically to input-device gesture-based graphical user interface control of a computer system.

In current application and graphical user interface development, there may be a trend to remove or narrow title bars, scroll bars, menu items, etc., from application windows. There may also be a trend to make window borders thinner or smaller as there may be a desire to optimize screen space or graphical user interface space residence. In general, this may present a graphical user interface problem for computer systems such as desktops, laptops, and mobile devices.

The problem may be that it has become more difficult for users to perform simple or routine tasks such as window and/or application management or any other task that requires a user to interact with a graphical user interface element that may be difficult for the user to see or reach with various input devices. Minimizing, moving, or repositioning windows may be exceedingly difficult because the window border items are too small. It may be difficult for users to move a pointer over such items. It may be particularly difficult for users with fine motor impairment in their hands or arms to interact with some of these graphical user interface elements. For some users with motor impairment, even regularly or normally-sized windows may be difficult to manage.

SUMMARY

Embodiments of the present disclosure relate to a method, and associated computer system and computer program product, for input device gesture-based graphical user interface control of a computer system. The method may include receiving an indication to recognize an input device gesture to be used for performing a graphical user interface action on the computer system. The method may further include training the computer system to recognize the input device gesture by receiving gesture data representative of the input device gesture to be used for performing the graphical user interface action on the computer system and defining the input device gesture based on the gesture data. The method may also include mapping the input device gesture to the graphical user interface action by receiving an indication to define the graphical user interface action on the computer system and defining the graphical user interface action based on at least one of receiving action data representative of the graphical user interface action on the computer system and receiving a selection indicating the graphical user interface action. The method may additionally include, in response to detecting performance of the input device gesture, performing the graphical user interface action on the computer system.

In an implementation, the method may include monitoring positioning of an input device to determine if the graphical user interface action performed on the computer system should be mapped to the input device gesture. Receiving the selection indicating the graphical user interface action may include displaying a dialog graphical user interface and receiving the selection indicating the graphical user interface action via the dialog graphical user interface.

One or more of the following features may be included. The graphical user interface action on the computer system may be performed via an operating system application programming interface based on the mapping of the input device gesture to the graphical user interface action. The graphical user interface action on the computer system may be performed via an application-specific application programming interface based on the mapping of the input device gesture to the graphical user interface action. The gesture data may be received via an input device wirelessly linked to the computer system. The method may further include monitoring input device data received from an input device to detect performance of the input device gesture.

DETAILED DESCRIPTION

Figure 1:
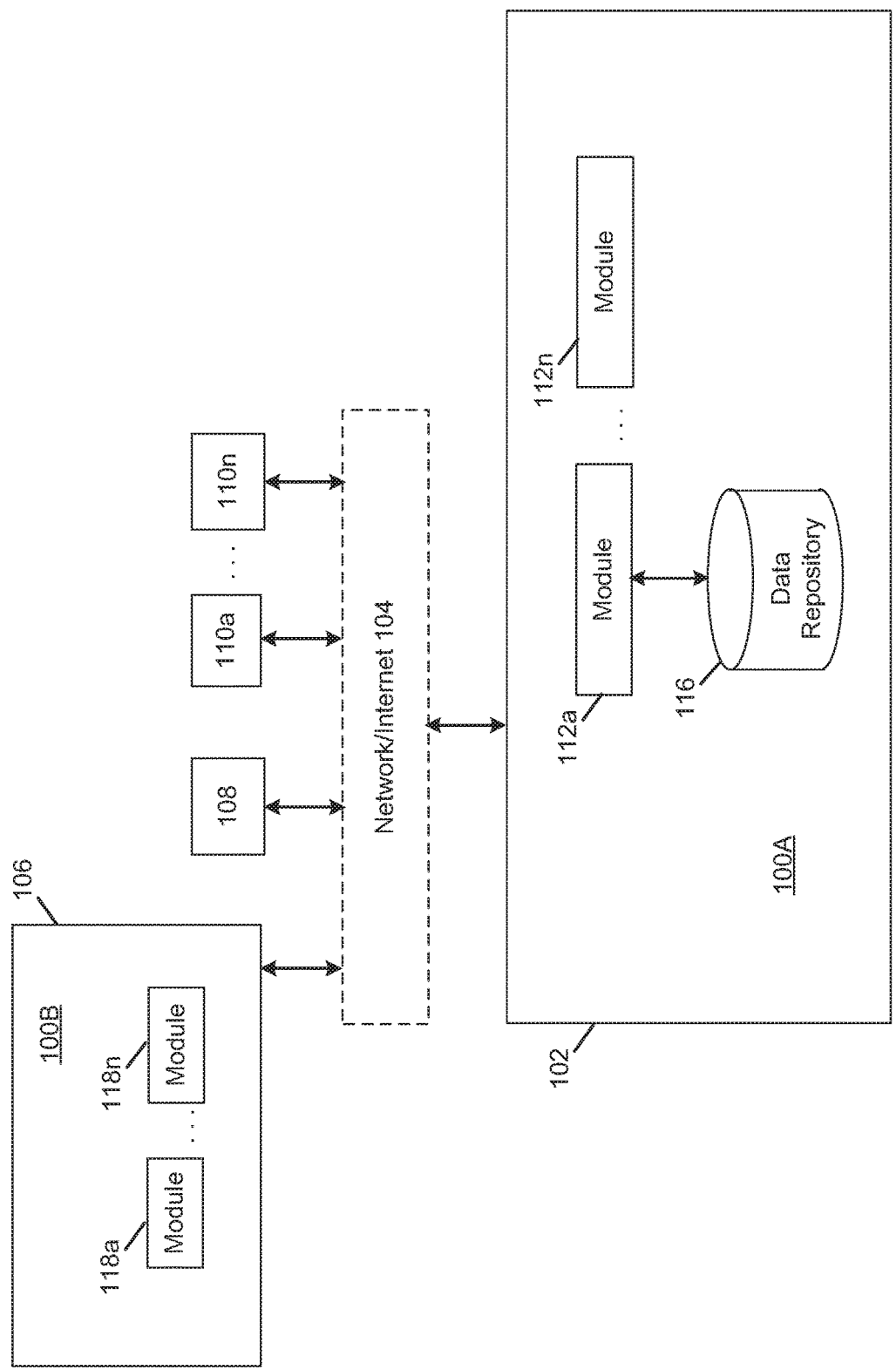
FIG. 1 depicts a block diagram of one or more example gesture-based graphical user interface control systems, in accordance with embodiments of the present disclosure.

Window and/or application management may be increasingly difficult for users, especially those with fine motor impairment, to accomplish due to shrinking of border features or items on application windows. Minimizing, moving, or repositioning windows may be exceedingly difficult because the window border items are too small. Thus, there may be a need for easier ways for users to perform actions on windows or other graphical user interface elements.

A computer system may be used to recognize user gestures or movements, either directly on the system itself and/or via IoT (Internet of Things) devices communicating with the device. Those gestures or movements may represent an action that will take place on the system. By linking the action to an operating system enabled function, the computer system may execute an action which may be difficult or tedious to replicate directly on the computer system.

For example a desktop, laptop, or mobile device user may be trying to resize a window with small borders (e.g., 1 pixel wide). The user may train the system to respond to a gesture (e.g., triple-clicking an area near the edge of the window such as within 200 pixels of the border). This gesture may cause window borders near the pointer to be magnified enough to make them more accessible.

In another example, a desktop, laptop, or mobile device user may wish to use their IoT device such as a smart watch to gesture to isolate their email application from all other opened applications. The user may register the IoT with the desktop, laptop, or mobile device and repeat an action that is meant be a gesture. The user may train their desktop, laptop, or mobile device to respond to the gesture (e.g., raising his/her arm while wearing a smart watch). This gesture may cause other windows except for the desired window (in this case, an email application) to be minimized or moved away, bringing the desired window to the forefront.

In another example a desktop, laptop, or mobile device user may be trying to move a window with a small title bar. The user may train their desktop, laptop, or mobile device to respond to a gesture (e.g., simultaneously clicking the first/second mouse buttons). This gesture may cause the pointer to grab the window it is currently on top of so the user can move it.

At an operating system level, users may be enabled to utilize an application interface override to train the computer system at the operating system level to respond to specific actions or gestures in order to gain access to difficult to reach graphical user interface items. A cognitive analysis of the action may interpret the personalized action range for the user. The system may recognize the gesture and it may be mapped to a user interface action. The cognitive analysis may continue even after training. Using native operating system application program interfaces (APIs), the system may perform routine operations based on the gesture specified (e.g., move a window, resize a window, minimize a window, open an application, close an application). Using APIs that can be shared from specific applications, the system may perform application-specific operations based on the gesture specified (e.g., indent a line in a word processor, search an application for something, play a desired playlist/movie, etc.).

Thus, using the techniques and features described herein, users may circumvent the accessibility problems described above. A training loop or guided process may be initiated in which the user may define a gesture for the operating system (or supporting application) to recognize and associate the gesture with a desired user interface action. The user may then train the operating system by repeating their chosen gesture until the operating system learns the gesture. This recognized gesture may then be mapped to the user interface action desired by the user, and the user interface action may be triggered by the operating system when the user performs the gesture.

The present disclosure may address the difficulties users may have with managing windows or acting on other graphical user interface elements. Using the techniques and features described in the present disclosure, systems and methods may be provided to access operating system or application objects (e.g., windows or graphical user interface elements). User positioning of an input device such as a mouse or wearable IoT (Internet of Things) device may be monitored and gestures made by the user with the input device may be defined. The systems and methods provided herein may be used to train and recognize gestures and link the gestures to actions that the user wants to perform on a window or other graphical user interface element, such as bringing a window into view, maximizing a window, minimizing a window, etc.

In an embodiment, a method or process for gesture-based graphical user interface control may include receiving an indication to recognize an input device gesture to be used for performing a graphical user interface action on the computer system. The method may further include training the computer system to recognize the input device gesture by receiving gesture data representative of the input device gesture to be used for performing the graphical user interface action on the computer system and defining the input device gesture based on the gesture data. The method may also include mapping the input device gesture to the graphical user interface action by receiving an indication to define the graphical user interface action on the computer system and defining the graphical user interface action based on at least one of receiving action data representative of the graphical user interface action on the computer system and receiving a selection indicating the graphical user interface action. The method may additionally include, in response to detecting performance of the input device gesture, performing the graphical user interface action on the computer system.

Referring to the drawings, FIG. 1 depicts a block diagram of gesture-based graphical user interface control system 100A in a server 102, in accordance with embodiments of the present disclosure. Embodiments of the gesture-based graphical user interface control system 100A may allow for controlling or managing a window or other graphical user interface element associated with the server 102. The various computer systems shown in FIG. 1, including the server, may be similar to and/or include similar components to the computer system of FIG. 5.

Server 102 may be in communication with a network 104 and/or the Internet through which server 102 may communicate with various other computer systems and machines. For example, server 102 may communicate with client devices 106, 108, and various user computer systems 110a . . . 110n which may also include gesture-based graphical user interface control systems such as gesture-based graphical user interface control system 100B of client device 106.

Gesture-based graphical user interface control system 100A may include one or more modules 112a-112n, in accordance with embodiments of the present disclosure. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the server 102. A module (whether hardware, software, or a combination thereof) may be designed to implement or execute one or more particular functions, routines, or operations, such as those shown in the blocks of FIG. 2. Similarly, gesture-based graphical user interface control system 100B of client device 106 may include modules 118a-118n.

In an example, embodiments of the modules 118a-118n may include one or more components of hardware and/or software program code for implementing or executing one or more particular functions, routines, or operations, such as those shown in blocks 202-222 of FIG. 2 and described below. Similarly, embodiments of the modules 112a-112n may include one or more components of hardware and/or software program code for implementing or executing one or more particular functions, routines, or operations, such as those shown in blocks 202-222 of FIG. 2 and described below.

Figure 2:
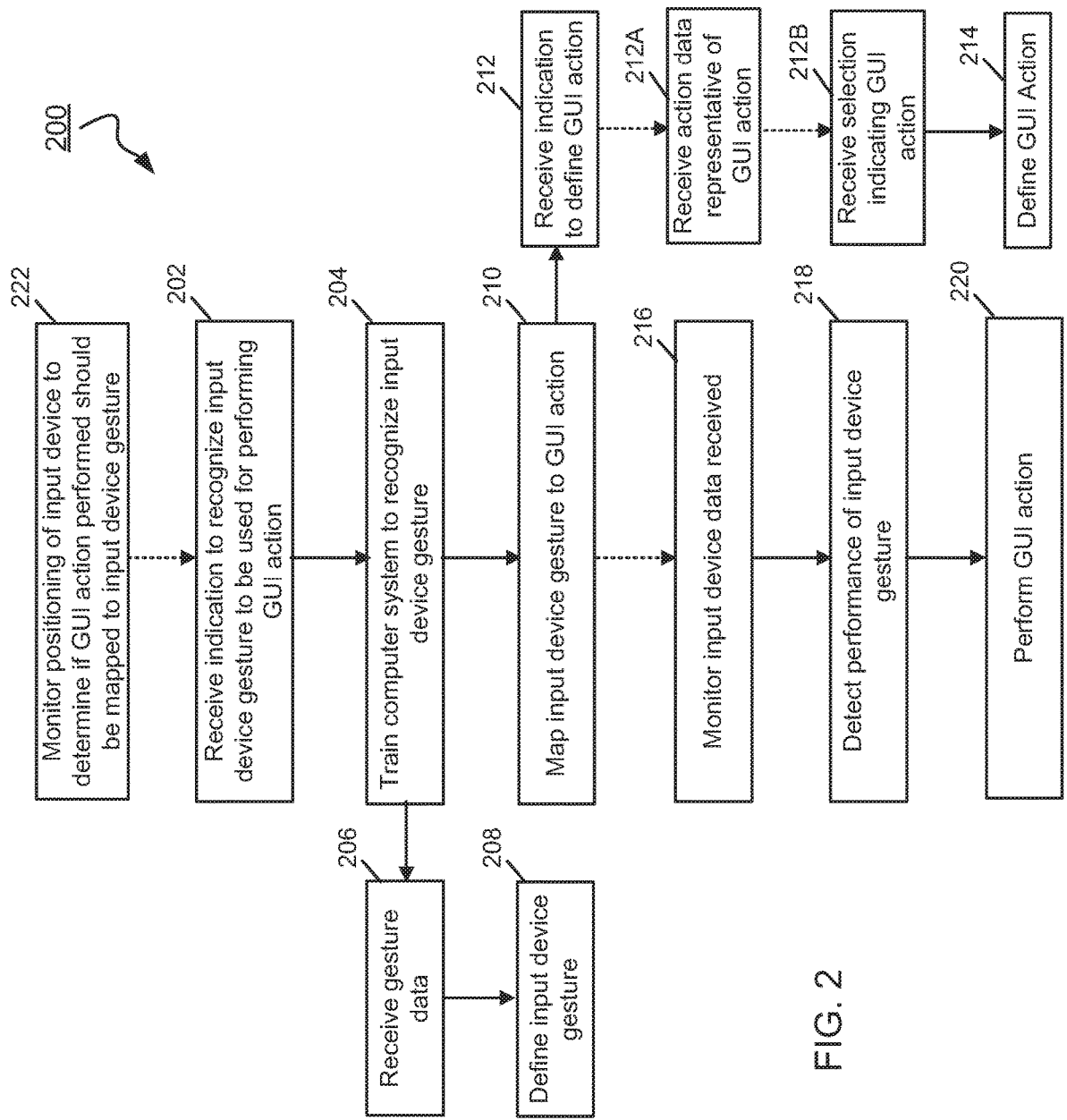
FIG. 2 depicts a flow chart of a method for gesture-based graphical user interface control, in accordance with embodiments of the present disclosure.

Referring now to FIG. 2, a flow chart of a method or process 200 for gesture-based graphical user interface control, in accordance with embodiments of the present disclosure, is shown. In an embodiment, a process 200 or algorithm may be implemented for gesture-based graphical user interface control and may run on or be executed by server 102 described in FIG. 1 or by one or more computer systems as defined generically in FIG. 5. Further, process 200 may be part of or may use portions of modules 112a-112n of FIG.

1. In an embodiment, a process 200 or algorithm may be implemented for gesture-based graphical user interface control and may run on or be executed by client device 106 described in FIG. 1 or by one or more computer systems as defined generically in FIG. 5. Further, process 200 may be part of or may use portions of modules 118a-118n of FIG. 1.

Figure 3B:
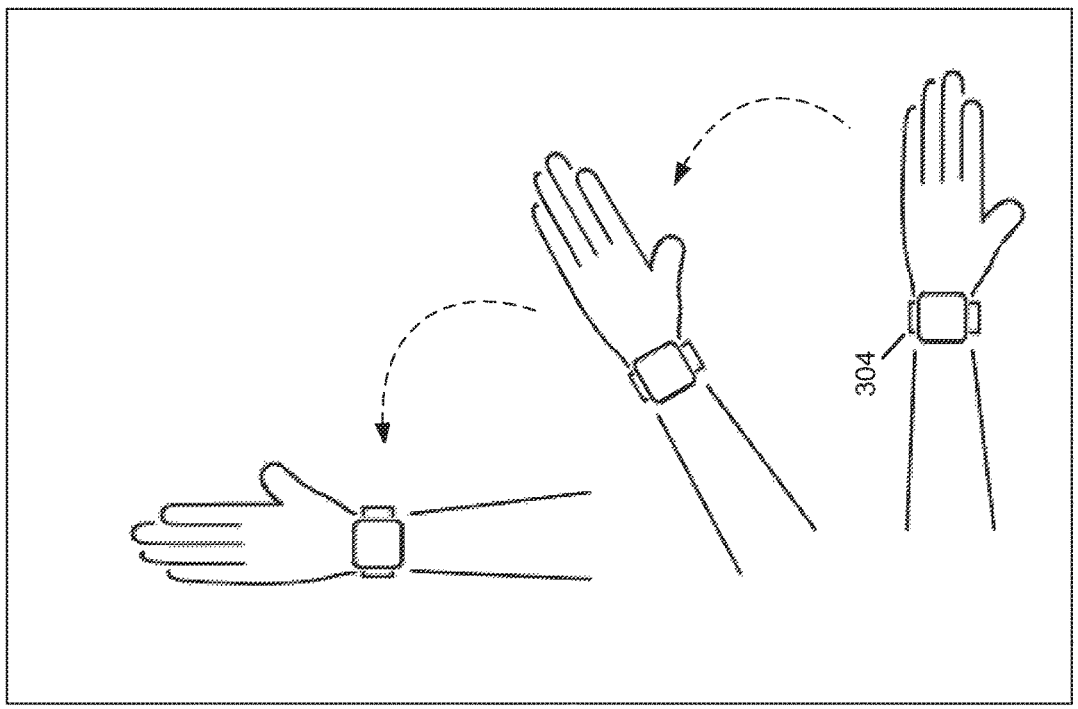
FIGS. 3A and 3B depict example input device gestures, in accordance with embodiments of the present disclosure.
Figure 3A:
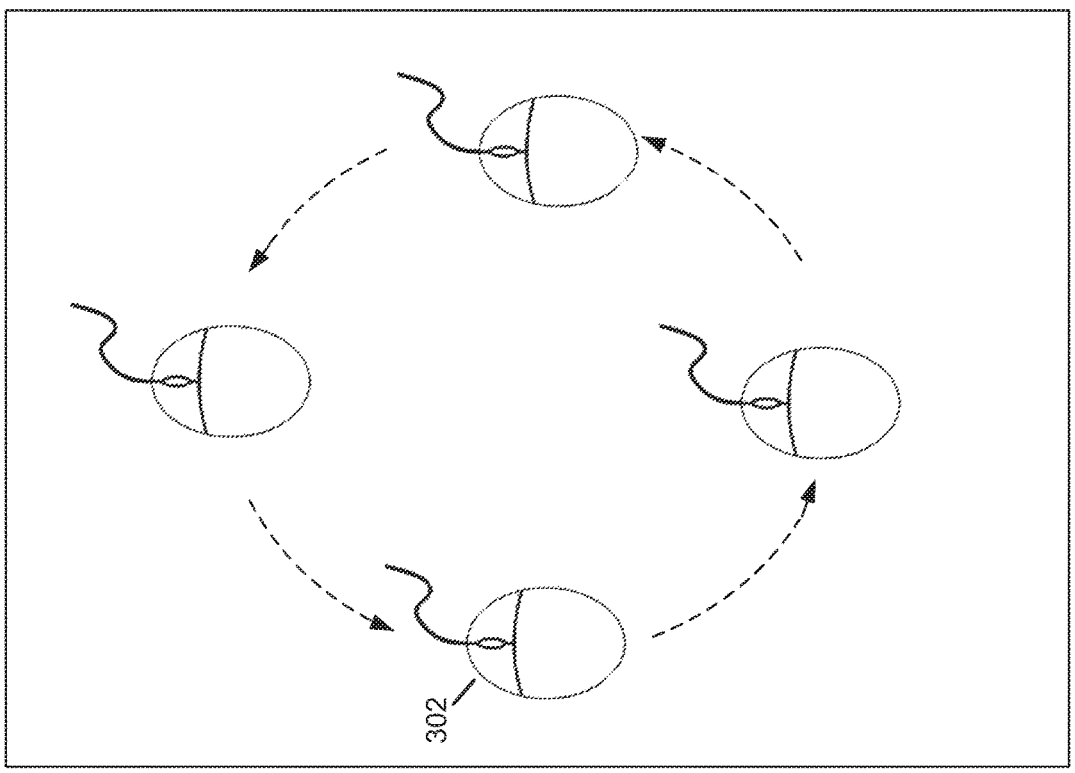

Referring now also to FIGS. 3A and 3B, process 200 may monitor 222 the positioning of an input device to determine if a graphical user interface action performed on a computer system (e.g., computer system 102 or 106) should be mapped to an input device gesture. The input device may be, for example input device 302 (e.g., a mouse) or input device 304 (e.g., a smart watch). Mouse 302 and smart watch 304 are provided for illustrative purposes only as the term input device as referred to herein may include, but is not limited to, a mobile device or smart device such as a mobile phone or tablet, camera, touchscreen system, keyboard, joystick, touchpad, pointing stick, trackball, joystick, gamepad, paddle, knob, remote control, kinect sensor, eye tracker, 3D scanner, image scanner, and/or an IoT device. The input device may be linked to the computer system either by wire or wirelessly through a wireless communication protocol such as Bluetooth.

The positioning of the input device may be monitored by receiving and analyzing (e.g., at the computer system) data representing XY coordinates (2D) or XYZ coordinates (3D) of the input device. For example, a mobile device such as a smart phone or smart watch may have a gyroscope and/or accelerometer which may be used to track movements along XYZ coordinates (3D). If a user wearing a smart watch or holding a smart phone raises his/her arm, a distinct numeric pattern of XYZ coordinates may be received (e.g., via Bluetooth at the computer system) and a distinct gesture may be detected through numeric data representative of the of XYZ coordinates.

A user may, for example, move mouse 302 in a circle as shown in FIG. 3A. The user may be attempting hover over an item on a window of a computer screen associated with the computer system. In another example, a user may wear smart watch 304 and raise his/her arm as shown in FIG. 3B. As mouse 302 or smart watch 304 is moved, a distinct numeric pattern of XY or XYZ coordinates may be received by the computer system as described above. In this way, process 200 may monitor 222 positioning of an input device (e.g., mouse 302 or smart watch 304) to determine if a graphical user interface action performed on the computer system should be mapped to the input device gesture (e.g., mouse 302 moving in a circle or smart watch 304 raised by an arm). The input device gesture may include various movements made by a user with the input device such as a distinct swipe of a touch screen, movement of a mouse in combination with one or more keys pressed on a keyboard, various hand or arm movements detected by a camera or smart watch, etc.

Further, process 200 may receive 202 an indication to recognize the input device gesture (e.g., mouse 302 moving in a circle or smart watch 304 raised by an arm) to be used for performing a graphical user interface action on the computer system. The indication may be determined by the computer system based on movement of the input device and action taken by the user. For example, and referring now also to FIG. 4A, a user may circle pointer 404 around a portion of a window (e.g., window 402) or other graphical user interface on screen 400 with mouse 302. The user may ultimately hover over a corner of window 402 and double arrow 406 may appear. The user may user double arrow 406 to resize window 402 as shown by resized window 408 of FIG. 4A. In this way, process 200 may automatically determine, based on the circling of pointer 404 around the corner of window 402 and resizing of window 402 by the user, an indication to recognize the circling of pointer 404 with mouse 302 as a gesture for performing the graphical user interface action of resizing a window on the computer system.

In an implementation, the user may manually provide the indication to recognize the input device gesture (e.g., mouse 302 moving in a circle or smart watch 304 raised by an arm) to be used for performing a graphical user interface action (e.g., resizing the window) by making a selection through an operating system dialog interface, for example. Process 200 may receive the selection as the indication to recognize the input device gesture, which may then be performed by the user via the input device.

Process 200 may also train 204 the computer system (e.g., computer system 102 or 106) to recognize the input device gesture (e.g., mouse 302 moving in a circle or smart watch 304 raised by an arm) by receiving 206 gesture data representative of the input device gesture to be used for performing the graphical user interface action (e.g., resizing the window). For example, process 200 may receive XY or XYZ coordinates representative of the user performing the gesture via the input device. These XY or XYZ coordinates or related numeric data may be the gesture data representative of the input device gesture. By receiving sets of XY or XYZ coordinates or related numeric data as the user performs the gesture over and over via the input device, process 200 may define 208 the input device gesture (e.g., mouse 302 moving in a circle or smart watch 304 raised by an arm) based on the gesture data. In an implementation, the input device gesture may be defined by ranges of gesture data received as the input device gesture is performed.

Process 200 may also include mapping 210 the input device gesture (e.g., mouse 302 moving in a circle or smart watch 304 raised by an arm) to the graphical user interface action (e.g., resizing the window). Mapping the input device gesture may include receiving 212 an indication to define the graphical user interface action on the computer system. For example, the indication may be determined based on movement of the input device and action taken by the user, such as mouse 302 moving in a circle or smart watch 304 raised by an arm and subsequent resizing of the window. Process 200 may also define 214 the graphical user interface action (e.g., resizing the window) based on receiving 212A action data representative of the graphical user interface action (e.g., resizing the window) on the computer system.

The action data representative of the graphical user interface action (e.g., resizing the window) may be received when the user ultimately takes the graphical user interface action after performing the input device gesture. The action data may include or be representative of standard operating system actions which may be graphical user interface actions as described herein, including, but not limited to, resizing a window, maximizing a window, moving a window, minimizing a window, opening/closing a window or application, moving a window from one display to second display, and/or positioning a window or multiple windows. These graphical user interface actions are provided for example purposes only and various other graphical user interface actions may be controlled by input device gestures as described herein.

In an implementation, process 200 may receive 212B a selection indicating the graphical user interface action (e.g., resizing the window) to define. For example, a user may make a selection through an operating system dialog interface and process 200 may receive the selection. Process 200 may also define 214 the graphical user interface action (e.g., resizing the window) based receiving 212B the selection indicating the graphical user interface action (e.g., resizing the window) to define.

Figure 4A:
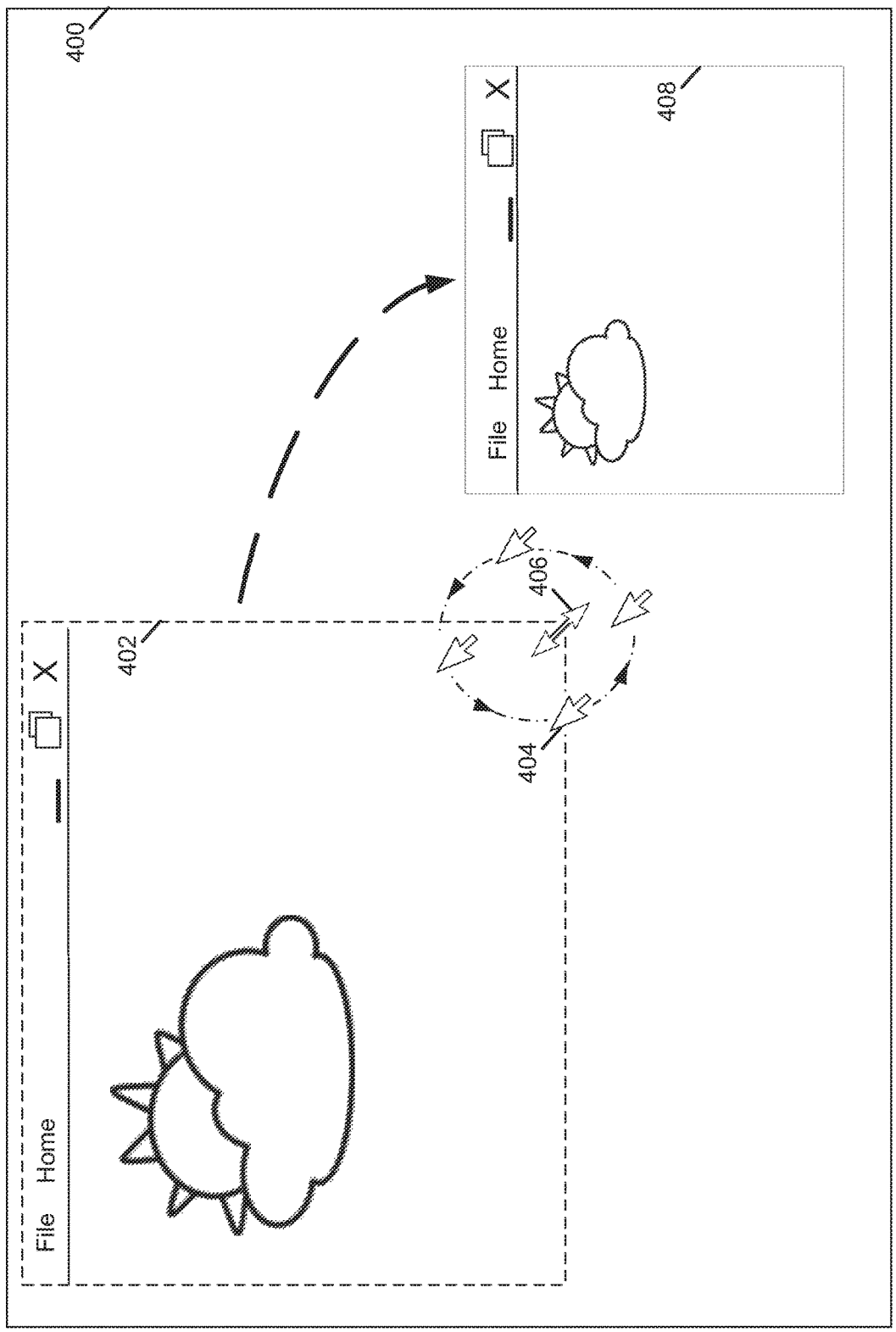
FIGS. 4A and 4B depict example graphical user interface actions, in accordance with embodiments of the present disclosure.
Figure 4B:
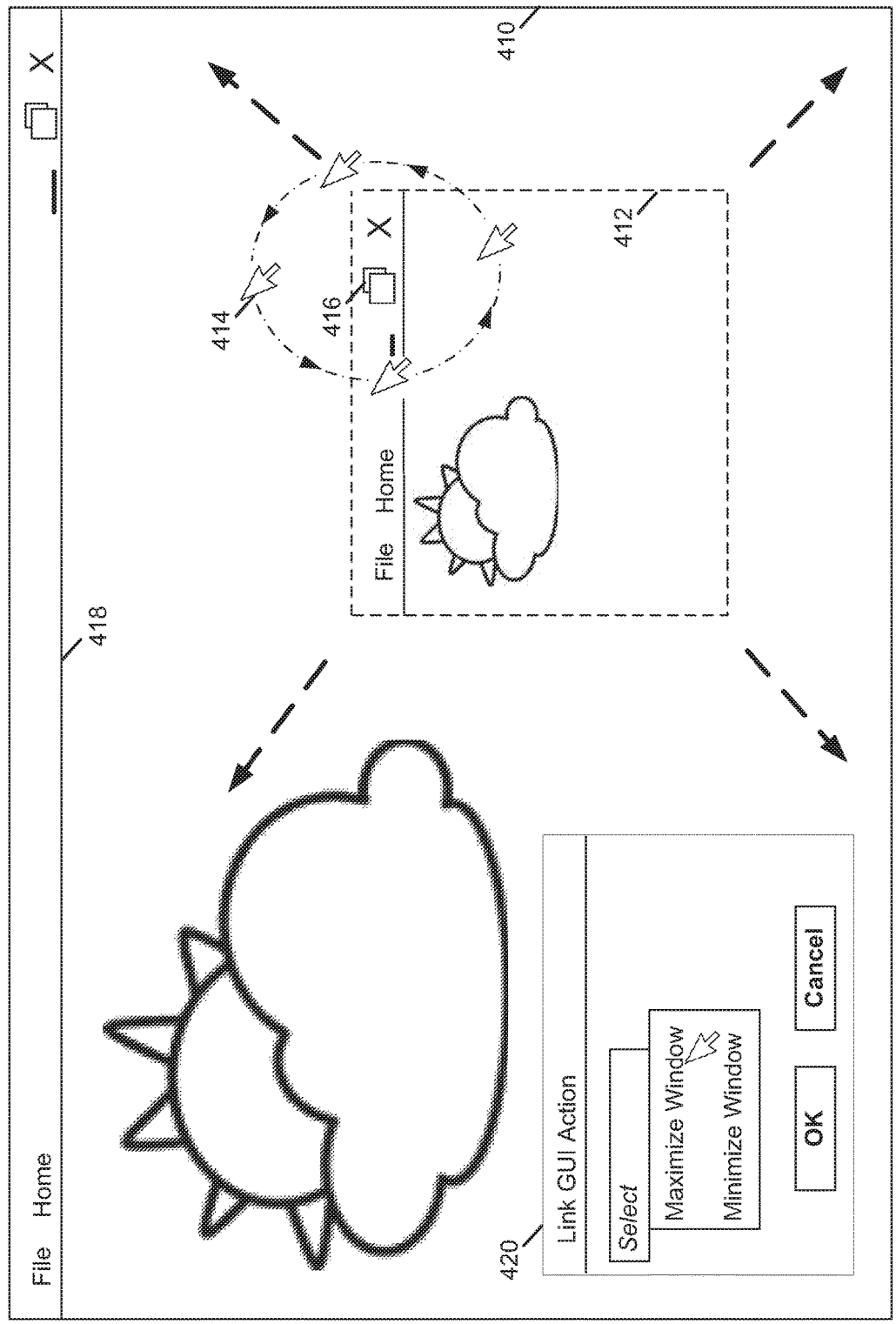

For example, and referring now also to FIG. 4B, a user may circle pointer 414 around a portion of a window (e.g., window 412) or other graphical user interface on screen 410 with mouse 302. The user may ultimately hover over a maximize icon 416 of window 412 and select maximize icon 416. The user may use maximize icon 416 to maximize window 412 as shown by maximized window 418 of FIG. 4B. Process 200 may, based on the circling of pointer 414 around the maximize icon 416 and maximizing of window 412 by the user, render dialog (or popup) box 420 which may allow the user to make a selection indicating the graphical user interface action (e.g., maximizing the window). In this way, receiving 212B the selection indicating the graphical user interface action (e.g., maximizing the window) may include displaying a dialog graphical user interface (e.g., dialog box 420) and receiving the selection indicating the graphical user interface action (e.g., maximizing the window) via the dialog graphical user interface (e.g., dialog box 420).

It should be noted that while the examples of FIG. 4A and FIG. 4B have been discussed herein in connection with circling of a mouse pointer as the input device gesture, various other input device gestures are possible including other movements of the mouse pointer or input device gestures performed via other input devices such as a smart watch. For example and as shown in FIG. 3B, a user may raise his/her hand while wearing smart watch 304 and process 200 may map the input device gesture of raising the user's arm while wearing smart watch 304 to the graphical user interface actions of resizing the window or maximizing the window as shown in FIGS. 4A and 4B, respectively, and as otherwise described herein.

Process 200 may further include monitoring 216 input device data received from the input device (e.g., watch 302 or smart watch 304) to detect performance of the input device gesture (e.g., mouse 302 moving in a circle or smart watch 304 raised by an arm). The input device data may be XY or XYZ coordinates or related numeric data and may be monitored by process 200 to determine if the input device data is gesture data representative of the input device gesture (e.g., mouse 302 moving in a circle or smart watch 304 raised by an arm). In some situations and during relatively normal use of an input device, most of the input device data received may not include gesture data representative of the input device gesture.

When the user decides to invoke the input device gesture to perform the mapped graphical user interface action, the input device data received may include gesture data representative of the input device gesture and process 200 may detect the gesture data by comparing the input device data received to the gesture data defined for the input device gesture, as described above. In response to detecting 218 performance of the input device gesture (e.g., mouse 302 moving in a circle or smart watch 304 raised by an arm), process 200 may perform 220 the graphical user interface action (e.g., resizing or maximizing the window) on the computer system.

In an implementation, the graphical user interface action (e.g., resizing or maximizing the window) on the computer system may be performed via an operating system application programming interface based on the mapping of the input device gesture (e.g., mouse 302 moving in a circle or smart watch 304 raised by an arm) to the graphical user interface action. Further, in an implementation, the graphical user interface action (e.g., indenting text, moving an object, etc.) on the computer system may be performed via an application-specific application programming interface based on the mapping of the input device gesture (e.g., mouse 302 moving in a circle or smart watch 304 raised by an arm) to the graphical user interface action.

Using the techniques and features described in the present disclosure, a technical solution to the technical problem of smaller and thinner window banners and/or tool bars being difficult to manage may be achieved. This may be especially useful for users with fine motor impairment in the hands or with windows on laptops or mobile devices. By training the system to recognize new gestures, the gestures may be user responsive and be correlated to motions the user makes while attempting to take certain user actions. In this way, recognizing gestures and linking them to desired actions may be achieved. The user may be enabled take the action without putting the mouse in a precise location because the system can detect what the user was doing just before the user took the action.

In an implementation, an operating system may open a training application that may feed a cognitive system to recognize a movement or gesture. The movement or gesture may be repeated so that the system can learn any variances in the gesture which are distinct. Once the gesture is captured by the operating system, the system may be trained as to what the gesture is intended to activate. There may be more than one way to link a gesture and an action. For example, the desired action may be performed while the system is explicitly looking for the action to be linked to the gesture. In an implementation, a predefined action that may have already been defined to the computer system may be used or selected. If an API exists to execute the action, it may be selected, or an action captured by the system may be replicated.

Once the system has been trained to recognize the action (e.g., trained with a cognitive engine) and the action has been linked to an operating system call which may impact an application running, the system may be in a continuous running mode (e.g. listening to keyboard/mouse combinations) or listening for feeds from outside linked applications (e.g. an IoT or Bluetooth linked device, for example). When the gesture to trigger the action has been detected or captured, the system may execute the action.

Communication protocols to outside devices may be used. Bluetooth may listen for a wireless mouse, for example, or a different set of inputs may be listened for. A mouse or camera may be linked to the operating system. The cognitive engine to analyze inputs from these devices may be local to the operating system but may also be cloud-based.

In an implementation, ongoing training may be used to account for changes in the user's gesture as time goes by. For example, after years, the way a user raises a hand may change. The system may recognize over time that slightly different coordinate or numerical data should be detected. As the pattern or coordinates change slightly over time, the system may adjust parameters according to the changed pattern or coordinates.

Figure 5:
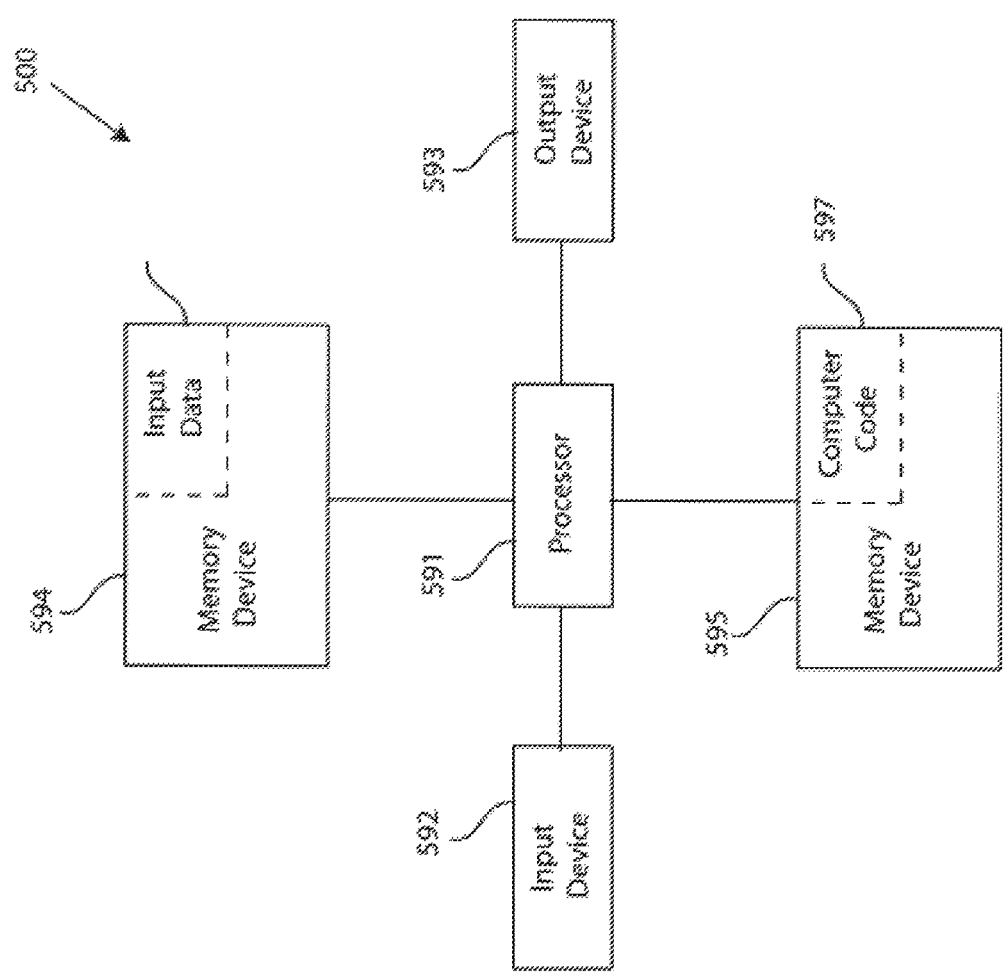
FIG. 5 illustrates a block diagram of a computer system for gesture-based graphical user interface control capable of implementing the method for gesture-based graphical user interface control of FIG. 2, in accordance with embodiments of the present disclosure.

FIG. 5 illustrates a block diagram of a computer system 500 that may be included in the system (e.g., as client device 106 or server 102) of FIG. 1 and for implementing the method or process of FIG. 2 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method or process for gesture-based graphical user interface control, in the manner prescribed by FIG. 2, wherein the instructions of the computer code 597 may be executed by processor 591 via memory device 595. The computer code 597 may include software or program instructions that may implement one or more algorithms for implementing the method or process for gesture-based graphical user interface control, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 116 as shown in FIG. 1.

As will be appreciated by one skilled in the art, in a first embodiment, the present disclosure may describe a method; in a second embodiment, the present disclosure may describe a system; and in a third embodiment, the present disclosure may describe a computer program product. Any of the components of the embodiments of the present disclosure can be deployed, managed, serviced, etc. by a service provider that offers to deploy or integrate computing infrastructure with respect gesture-based graphical user interface control systems and methods. Thus, an embodiment of the present disclosure is a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to perform gesture-based graphical user interface control. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method or process for performing gesture-based graphical user interface control. Thus, the present disclosure describes a process for supporting, deploying and/or integrating computer infrastructure, integrating, hosting, maintaining, and deploying computer-readable code into the computer system 500, wherein the code in combination with the computer system 500 is capable of performing a method or process for performing gesture-based graphical user interface control.

A computer program product of the present disclosure comprises one or more computer readable hardware storage devices having computer readable program code stored therein, said program code containing instructions executable by one or more processors of a computer system to implement the methods or processes of the present disclosure.

A computer system of the present disclosure comprises one or more processors, one or more memories, and one or more computer readable hardware storage devices, said one or more hardware storage devices containing program code executable by the one or more processors via the one or more memories to implement the methods or processes of the present disclosure.

The present disclosure describes a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
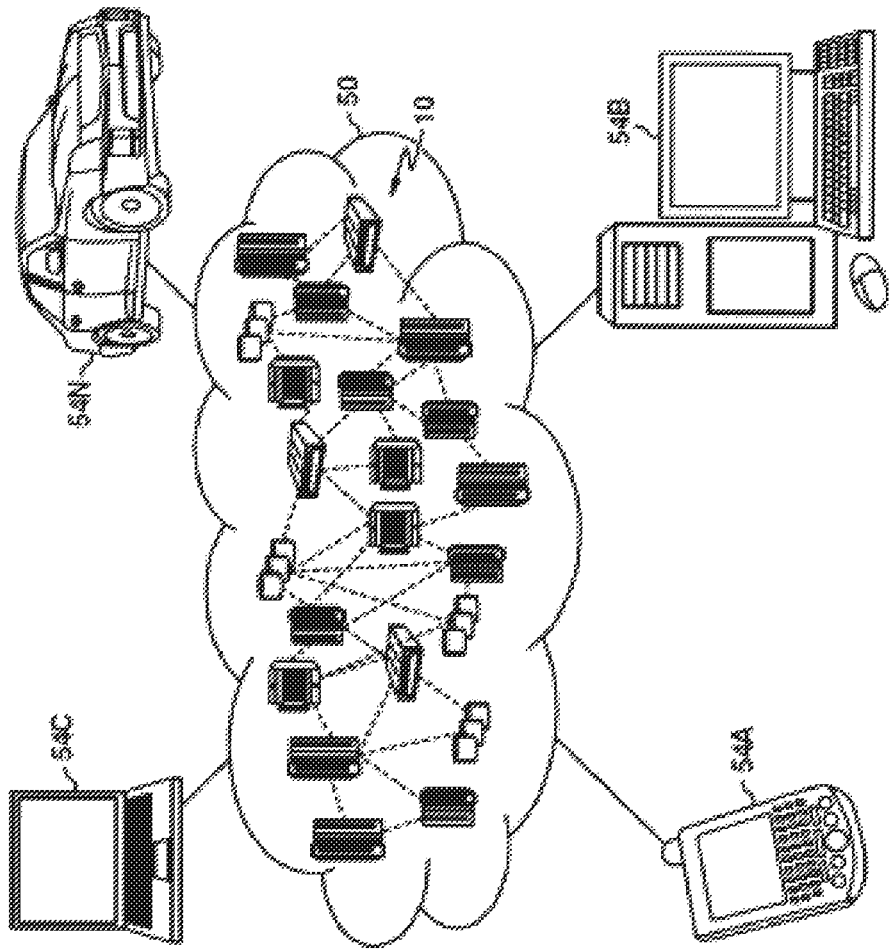
FIG. 6 depicts a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
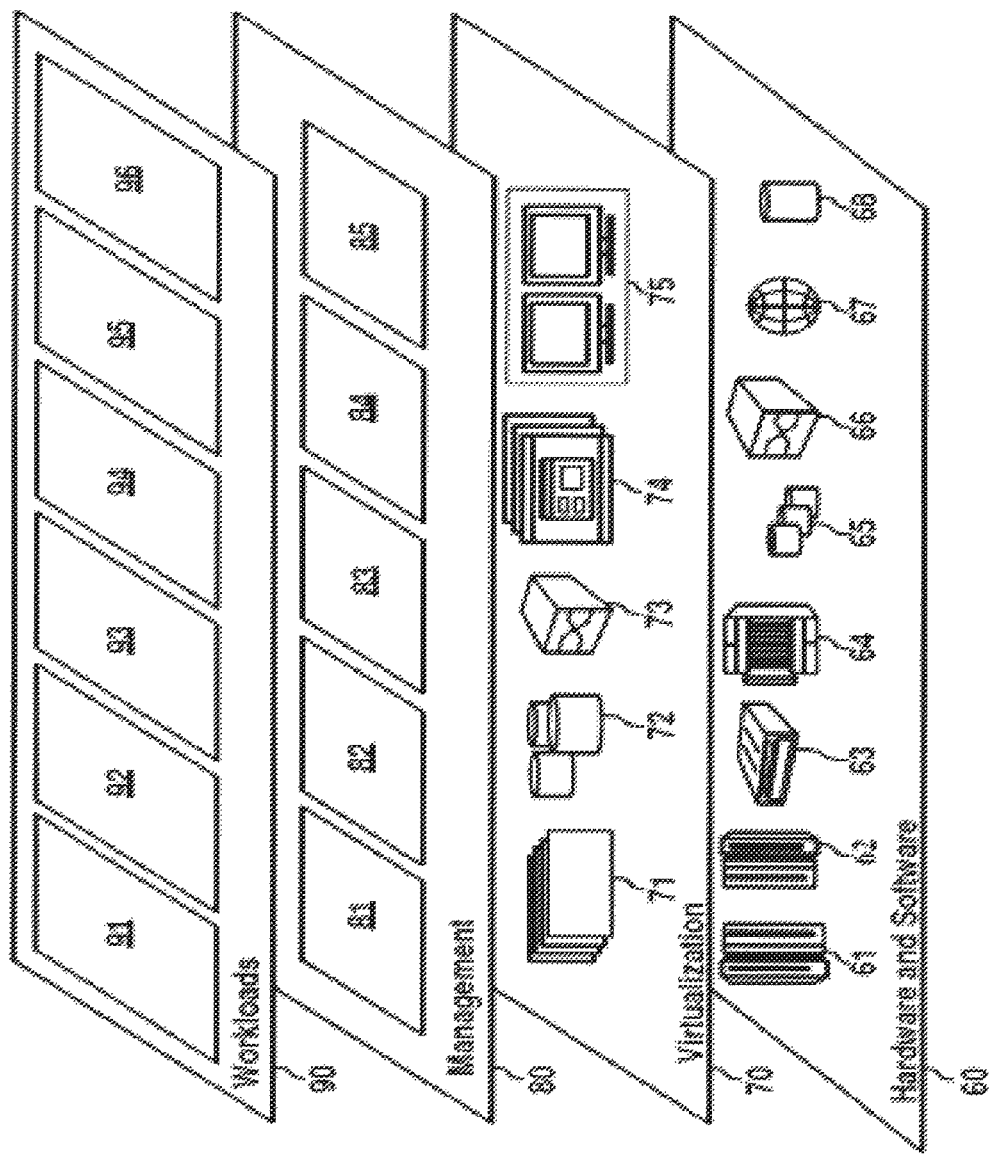
FIG. 7 depicts abstraction model layers, in accordance with embodiments of the present disclosure.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and calendar management for determining availability of an invitee 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for input device gesture-based graphical user interface control of a computer system, said method comprising:
   mapping, by a processor of the computer system, an input device gesture to a graphical user interface action of magnifying a window border in a computer screen associated with the computer system to increase accessibility of the window border to the input device, said window border having a width that is too small to be accessible to the input device, said input device gesture being performed outside of the window border and within a predetermined number of pixels from the window border;
   receiving input device data, by the processor, from an input device moving along a trajectory controlled by a user's hand moving with respect to a graphical user interface of a computer screen of the computer system while the input device is in direct physical contact with the user's hand and while the input device is not in direct physical contact with the computer screen, said input device data comprising two-dimensional XY coordinates or three-dimensional XYZ coordinates of the input device on the trajectory;
   detecting, by the processor, performance of the input device gesture by the input device, said detecting performance of the input device gesture comprising ascertaining that the received input device data is gesture data representative of the input device gesture, said ascertaining comprising comparing the received input device data to gesture data defined for the input device gesture; and
   in response to said detecting performance of the input device gesture, performing, by the processor, the graphical user interface action on the graphical user interface of the computer screen of the computer system.

2. The method of claim 1, wherein the graphical user interface action is performed via at least one of:
   an operating system application programming interface based on said mapping the input device gesture to the graphical user interface action; and
   an application-specific application programming interface based on said mapping the input device gesture to the graphical user interface action.

3. The method of claim 1, wherein the input device data comprises the two-dimensional XY coordinates of the input device on the trajectory.

4. The method of claim 3, wherein the input device is a mouse.

5. The method of claim 1, wherein the input device data comprises the three-dimensional XYZ coordinates of the input device on the trajectory.

6. The method of claim 5, wherein the input device is a smart watch.

7. The method of claim 1, wherein the window border's width is one pixel wide.

8. A computer system for input device gesture-based graphical user interface control of the computer system, comprising: a processor; a memory device coupled to the processor; and a computer readable storage device coupled to the processor, wherein the storage device contains program code executable by the processor via the memory device to implement a method for input device gesture-based graphical user interface control of the computer system, said method comprising:
   mapping, by the processor, an input device gesture to a graphical user interface action of magnifying a window border in a computer screen associated with the computer system to increase accessibility of the window border to the input device, said window border having a width that is too small to be accessible to the input device, said input device gesture being performed outside of the window border and within a predetermined number of pixels from the window border;
   receiving input device data, by the processor, from an input device moving along a trajectory controlled by a user's hand moving with respect to a graphical user interface of a computer screen of the computer system while the input device is in direct physical contact with the user's hand and while the input device is not in direct physical contact with the computer screen, said input device data comprising two-dimensional XY coordinates or three-dimensional XYZ coordinates of the input device on the trajectory;
   detecting, by the processor, performance of the input device gesture by the input device, said detecting performance of the input device gesture comprising ascertaining that the received input device data is gesture data representative of the input device gesture, said ascertaining comprising comparing the received input device data to gesture data defined for the input device gesture; and
   in response to said detecting performance of the input device gesture, performing, by the processor, the graphical user interface action on the graphical user interface of the computer screen of the computer system.

9. The computer system of claim 8, wherein the graphical user interface action is performed via at least one of:
   an operating system application programming interface based on said mapping the input device gesture to the graphical user interface action; and
   an application-specific application programming interface based on said mapping the input device gesture to the graphical user interface action.

10. The computer system of claim 8, wherein the input device data comprises the two-dimensional XY coordinates of the input device on the trajectory.

11. The computer system of claim 10, wherein the input device is a mouse.

12. The computer system of claim 8, wherein the input device data comprises the three-dimensional XYZ coordinates of the input device on the trajectory.

13. The computer system of claim 12, wherein the input device is a smart watch.

14. The computer system of claim 8, wherein the window border's width is one pixel wide.

15. A computer program product, comprising a computer readable hardware storage device storing computer readable program code executable by a processor of a computer system to implement a method for input device gesture-based graphical user interface control of the computer system, said method comprising:
   mapping, by the processor, an input device gesture to a graphical user interface action of magnifying a window border in a computer screen associated with the computer system to increase accessibility of the window border to the input device, said window border having a width that is too small to be accessible to the input device, said input device gesture being performed outside of the window border and within a predetermined number of pixels from the window border;
   receiving input device data, by the processor, from an input device moving along a trajectory controlled by a user's hand moving with respect to a graphical user interface of a computer screen of the computer system while the input device is in direct physical contact with the user's hand and while the input device is not in direct physical contact with the computer screen, said input device data comprising two-dimensional XY coordinates or three-dimensional XYZ coordinates of the input device on the trajectory;
   detecting, by the processor, performance of the input device gesture by the input device, said detecting performance of the input device gesture comprising ascertaining that the received input device data is gesture data representative of the input device gesture, said ascertaining comprising comparing the received input device data to gesture data defined for the input device gesture; and
   in response to said detecting performance of the input device gesture, performing, by the processor, the graphical user interface action on the graphical user interface of the computer screen of the computer system.

16. The computer program product of claim 15, wherein the graphical user interface action is performed via at least one of:
   an operating system application programming interface based on said mapping the input device gesture to the graphical user interface action; and
   an application-specific application programming interface based on said mapping the input device gesture to the graphical user interface action.

17. The computer program product of claim 15, wherein the input device data comprises the two-dimensional XY coordinates of the input device on the trajectory.

18. The computer program product of claim 17, wherein the input device is a mouse.

19. The computer program product of claim 15, wherein the input device data comprises the three-dimensional XYZ coordinates of the input device on the trajectory.

20. The computer program product of claim 15, wherein the window border's width is one pixel wide.

* * * * *